United States Patent [19]

Takanashi et al.

[11] Patent Number: 4,916,528
[45] Date of Patent: Apr. 10, 1990

[54] COLOR STRIPE FILTER IN COLOR IMAGE PICKUP APPARATUS

[75] Inventors: Itsuo Takanashi, Kamakura; Shintaro Nakagaki, Fujisawa; Hiroshi Ichimura; Ichiro Negishi, both of Yokohama; Masaru Osada, Yokosuka; Wataru Katase, Yokohama; Kaoru Kitami, Yokosuka, all of Japan

[73] Assignee: Victor Company of Japan, Ltd., Yokohama, Japan

[21] Appl. No.: 291,202

[22] Filed: Dec. 28, 1988

[30] Foreign Application Priority Data

Dec. 28, 1987 [JP] Japan ................................. 62-335481
Feb. 3, 1988 [JP] Japan ............................. 63-13326[U]
Mar. 9, 1988 [JP] Japan ............................. 63-31346[U]
Sep. 16, 1988 [JP] Japan ........................... 63-121956[U]

[51] Int. Cl.⁴ ......................... H04N 9/07; H04N 9/83
[52] U.S. Cl. ...................................... 358/44; 358/41; 358/42; 358/43
[58] Field of Search ....................... 358/41, 42, 43, 44, 358/48

[56] References Cited

U.S. PATENT DOCUMENTS

| | | | |
|---|---|---|---|
| 4,395,629 | 7/1983 | Sasano et al. | 358/44 |
| 4,565,756 | 1/1986 | Needs et al. | 358/44 |
| 4,580,159 | 4/1986 | Manabe | 358/43 |
| 4,630,107 | 12/1986 | Takanashi et al. | 358/44 |
| 4,652,911 | 3/1987 | Teranishi et al. | 358/43 |
| 4,710,804 | 12/1987 | Ide | 358/44 |
| 4,721,999 | 1/1988 | Takemura et al. | 358/44 |

FOREIGN PATENT DOCUMENTS

0277879 12/1987 Japan .
0135087 6/1988 Japan .

Primary Examiner—Howard W. Britton
Assistant Examiner—Kim Yen Vu
Attorney, Agent, or Firm—Lowe, Price, LeBlanc, Becker & Shur

[57] ABSTRACT

A color separation stripe filter in a color image pickup apparatus in which a color image is focused on a photoelectric conversion target through the filter to be converted to an electrostatic image so as to generate a color multiplexed signal. The filter comprises a plurality of recurrent groups of three different color stripes successively arranged at periodic intervals. The first color stripe has a characteristic showing a peak transmission factor in a red color region, the second color stripe has a characteristic showing a peak transmission factor in a green color region which is substantially equal to the peak transmission factor of the first color stripe, and the third color stripe has a characteristic showing a negative peak transmission factor at a wavelength between 500 nm and 530 nm so as to produce first and second peak transmission factors in a blue region and said green region. The first peak transmission factor is substantially equal to each of the peak transmission factors of the first and second color stripes and the second peak transmission factor existing in the green color region to be 50% to 80% of each of the peak transmission factors of the first and second color stripes, a curve of the characteristic of the third color stripe in the green region being substantially similar in configuration to that of the second color stripe.

12 Claims, 9 Drawing Sheets

LIGHT

COLOR STRIPE FILTER IN COLOR IMAGE PICKUP APPARATUS

BACKGROUND OF THE INVENTION

The present invention relates generally to color image pickup apparatus such as color video camera, and more particularly to a color stripe filter which is disposed in a light path directing to a photo-electric conversion section of a color image pickup tube for separation of object-imaging light into three color signals which are in turn derived as a color multiplexed signal by the color image pickup tube.

Light from an object viewed from a color image pickup apparatus is focused on a photo-electric conversion target through a color stripe filter so as to be converted to an electrostatic image which is scanned in raster form by an electron beam under control of a deflection system to thereby produce a color multiplexed signal corresponding to the light image of the object. The color stripe filter generally comprises a plurality of recurrent groups of color stripes of different colors successively arranged at periodic intervals so that the color multiplexed signal includes a carrier signal component having a frequency, which is in inverse relation to the periodic interval of the recurrent groups of the color stripes, and modulated in amplitude and phase in accordance with color information. Here, when imaging an achromatic color object by the color image pickup apparatus, it should be required that the color multiplexed signal to be outputted from the image pickup tube includes only a luminance signal without containing color signals. One possible solution is that the peaks of transmission factors of the different color stripes is arranged to be equal to each other. However, the reproduced achromatic color signal tends to have a characteristic different from the relative luminosity factor, or spectral luminous efficiency, of the human eye. On the other hand, in cases where the reproduced achromatic color signal is arranged so as to have the characteristic substantially coincident with the spectral luminous efficiency, for example, in accordance with the known NTSC system, difficulty is generally encountered to meet the requirement in which the outputted color multiplexed signal contains only the luminance signal. Thus, a further improvement would be required from the viewpoint of meeting both the requirements at the same time.

Furthermore, in such a color image pickup apparatus using a color separation stripe filter, while the red color component and green color component can directly be obtained by the transmission lights of a red color stripe and a green color stripe of the color separation stripe filter, the blue color component is obtained by subtracting the green color component obtained by the green color stripe from the cyan color component obtained by a cyan color stripe thereof. In the case of surely obtaining the blue color component, it should be required that in the green region (500 to 600 nm in wavelength) the spectral characteristic of the cyan color stripe is similar in configuration to that of the green color stripe. Difficulty can be encountered to stably meet this requirement in conventional color separation stripe filters.

SUMMARY OF THE INVENTION

The present invention has been developed in order to remove the above-mentioned problems inherent to conventional color separation stripe filters.

It is therefore an object of the present invention to provide a color separation stripe filter which allows an excellent color reproduction of an object to be imaged by a color image pickup apparatus.

According to the present invention, in a color image pickup apparatus including a color image pickup tube in which a color image is focused on a photo-electric conversion target through a color separation stripe filter disposed in a light path leading to the photo-electric conversion target and converted to an electrostatic image which is scanned in raster form by an electron beam under control of a deflection system so as to generate a color multiplexed signal from said photo-electric conversion target, the color separation stripe filter comprising a plurality of recurrent groups of a first color stripe for transmitting red color light, a second color stripe for transmitting green color light and a third color stripe for transmitting cyan color light successively arranged at periodic intervals, wherein the first color stripe has a transmission characteristic showing a peak transmission factor in a red color region, the second color stripe has a transmission characteristic showing a peak transmission factor in a green color region which peak transmission factor is substantially equal to the peak transmission factor of the first color stripe, and the third color stripe has a transmission characteristic showing negative peak transmission factor at a wavelength between 500 nm and 530 nm so as to produce first and second peak transmission factors in a blue region and said green region, the first peak transmission factor being substantially equal to each of the peak transmission factors of the first and second color stripes, the second peak transmission factor of the third color stripe occurring substantially at the same wavelength as the peak transmission factor of the second color stripe, and the ratio of a transmission factor of the third color stripe to that of the second color stripe falling within a range between 50% and 80% in a wavelength region over a wavelength at which the second color stripe has the peak transmission factor and the resulting value of the ratio within this range is substantially maintained in said wavelength region.

Furthermore, according to the present invention, in a color image pickup apparatus including a color image pickup tube in which a color image is focused on a photo-electric conversion target through a color separation stripe filter disposed in a light path leading to the photo-electric conversion target and converted to an electrostatic image which is scanned in raster form by an electron beam under control of a deflection system so as to generate a color multiplexed signal from the photo-electric conversion target, the color separation stripe filter comprising a plurality of recurrent groups of first to third portions successively arranged at periodic intervals in directions normal to a direction of light advancing to the color separation stripe filter, wherein the first portion is composed of a portion of a first color stripe for cutting off transmission of a red color component of the light and a second color stripe for cutting off transmission of a blue component of the light, the second color stripe being piled up on said portion of said first color stripe in the light-advancing direction, the second portion is composed of another second color stripe and a portion of a third color stripe for repressing transmission of a green component of the light, the portion of said third color stripe being piled up on the another second color stripe in the light-advancing direction, the third portion is composed of the other portion of the first color stripe and the other portion of the third color stripe which is piled up thereon in the light-advancing direction, the third color stripe having a transmission characteristic in which a transmission factor for the green component is smaller than transmission factors for the red and blue components.

Still further, according to the present invention, in a color image pickup apparatus including a color image pickup tube in which a color image is focused on a photo-electric conversion target through a color separation stripe filter disposed in a light path leading to the photo-electric conversion target and converted to an electrostatic image which is scanned in raster form by an electron beam under control of a deflection system so as to generate a color multiplexed signal from the photo-electric conversion target, the color separation stripe filter comprising a plurality of recurrent groups of first to third portions successively arranged at periodic intervals in directions normal to a direction of light advancing to said color separation stripe filter, wherein the first portion is composed of a portion of a first color stripe for cutting off transmission of a red color component of the light and a second color stripe for cutting off transmission of a blue component of the light, said second color stripe being piled up on said portion of the first color stripe in the light-advancing direction, the second portion is composed of another second color stripe and a portion of a neutral density stripe which is made of a metallic layer, the portion of the neutral density stripe being piled up on said another second color stripe in the light-advancing direction, the third portion is composed of the other portion of the first color stripe and the other portion of said neutral density stripe which is piled up thereon in the light-advancing direction.

In addition, according to the present invention, in a color image pickup apparatus including a color image pickup tube in which a color image is focused on a photo-electric conversion target through a color separation stripe filter disposed in a light path leading to the photo-electric conversion target and converted to an electrostatic image which is scanned in raster form by an electron beam under control of a deflection system so as to generate a color multiplexed signal from the photo-electric conversion target, the color separation stripe filter comprising a plurality of recurrent groups of first to third portions successively arranged at periodic intervals in directions normal to a direction of light advancing to the color separation stripe filter, wherein the first portion is composed of a portion of a first color stripe for transmitting cyan color light and a second color stripe for transmitting yellow color light so as to transmitting first color light, the second color stripe being piled up on the portion of the first color stripe in the light-advancing direction, the second portion is composed of the other portion of said first color stripe and a neutral density stripe piled up thereon in the light-advancing direction so as to transmit second color light, and the third portion is arranged so as to transmit third color light.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
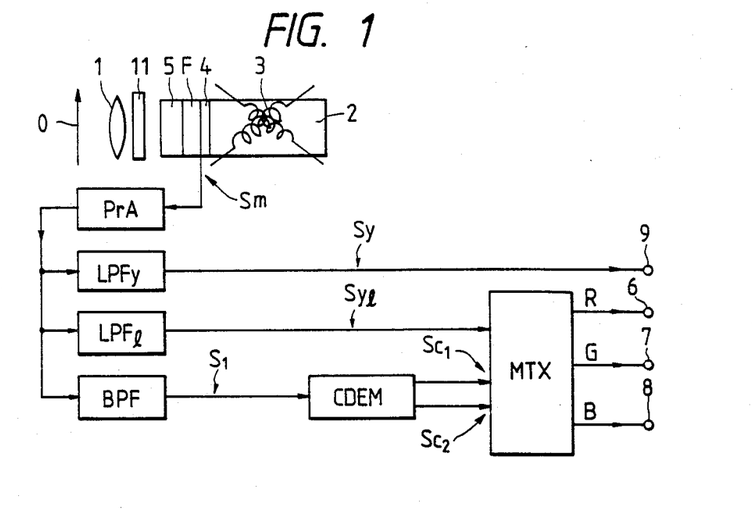
FIG. 1 is a block diagram showing one example of color image pickup apparatus into which color separation stripe filters according to the present invention are incorporated.
Figure 3:
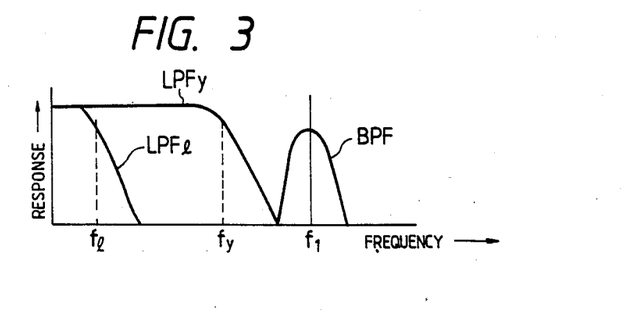
FIG. 3 is a graphic illustration for describing characteristics of low-pass filters and a bandpass filter to be used in the FIG. 1 color image pickup apparatus.
Figure 5:
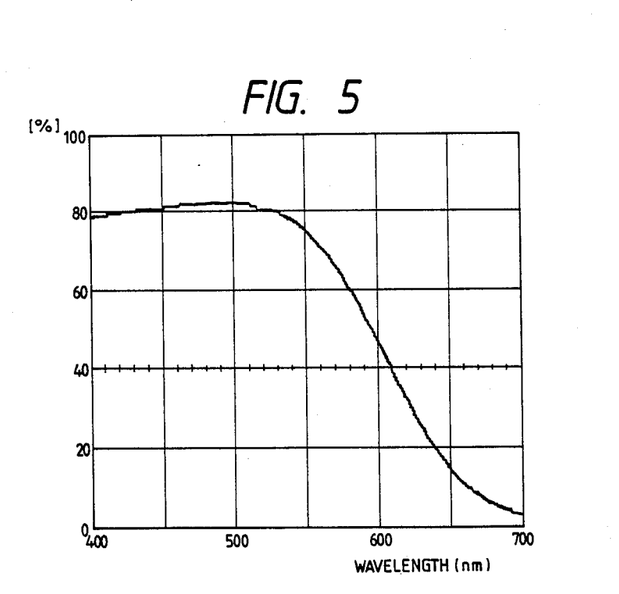
FIG. 5 shows one example of a spectral transmission characteristic of an infrared cutoff filter.

Referring now to FIG. 1, there is illustrated a color image pickup apparatus which is shown as including a color image pickup tube 2 adapted so as to produce an output signal, i.e., a color multiplexed signal Sm, in response to light from an object 0. The color image pickup tube 2 comprises a pair of vertical and horizontal deflection yokes 3, a color separation stripe filter F disposed between the rear side of a transparent face plate 5 and the front side of a photo-electric conversion section, i.e., a target having at its front portion a photo-electric conversion surface, 4 which is adapted to be scanned by an electron beam emitted from an electron gun, not shown, of the color image pickup tube 2 in accordance with a scanning control signal. Light from the object 0 is focused by a lens 1 on the front surface of the photo-electric conversion target 4 after passed through an infrared cutoff filter 11 and the color separation stripe filter F. Also included in the color image pickup apparatus is a preamplifier PrA which amplifies a color multiplexed signal Sm from the color image pickup tube 2 which signal comprises a direct-current component and a color multiplex carrier signal produced by modulating in amplitude and phase a color multiplex carrier having a specific frequency f1, the amplified color multiplexed signal Sm being supplied to low-pass filters LPFy, LPF1 and a bandpass filter BPF which is in turn coupled to a color signal demodulation circuit CDEM. In response to the supply of the amplified color multiplexed signal Sm, the low-pass filter LPFy whose cut-off frequency is fy outputs a wideband luminance signal Sy, having a relatively wide band, to an output terminal 9, another low-pass filter LPF1 whose cut-off frequency is f1 outputs a narrowband luminance signal Syl, having a relatively narrow band, to a matrix circuit MTX, and the bandpass filter BPF extracts a modulated color signal (fundamental component of color multiplex carrier signal) S1 which is in turn supplied to the color signal demodulation circuit CDEM including a synchronous detector, not shown, whereby the demodulation is effected by synchronous detection operation. The demodulation circuit CDEM outputs demodulated color signals Sc1, Sc2 to the matrix circuit MTX which, in response to the output signals Syl, Sc1, Sc2 of the low-pass filter LPF1 and the demodulation circuit CDEM, supplies three primary color signals R, G, B to output terminals 6 to 8. Here, an example of the spectral transmission characteristic of the infrared cutoff filter 11 is shown in FIG. 5, and the response-to-frequency characteristics of the low-pass filters LPFy, LPF1 and the bandpass filter BPF are as shown in FIG. 3.

Figure 2:
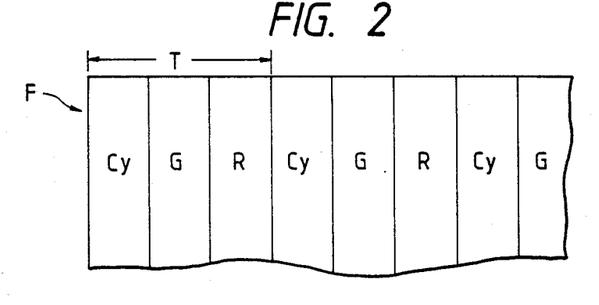
FIG. 2 is a plan view showing a general arrangement of a color separation stripe filter.
Figure 4:
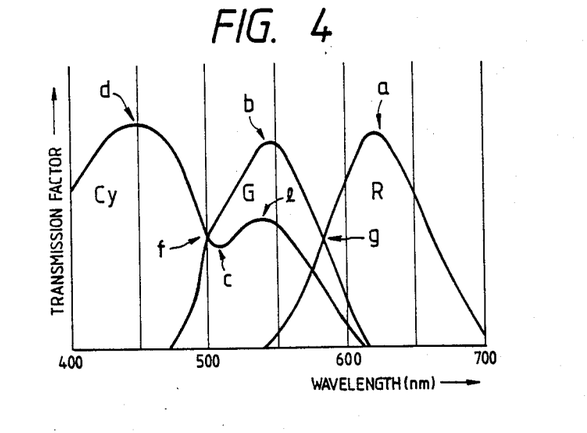
FIG. 4 is a graphic diagram showing a spectral characteristic of a color separation stripe filter according to a first embodiment of the present invention.

The color separation stripe filter F, as shown in FIG. 2 which is a plan view partially showing an arrangement of the color separation stripe filter F, comprises successive repetitions of a specific pattern of color stripes of respectively diferent colors, i.e., a plurality of recurrent groups of a first color stripe R for transmitting red color light, a second color stripe G for transmitting green color light, and a third color stripe Cy for transmitting cyan color light, the period of the repetitions being indicated by character T in FIG. 2. The features of the first to third color stripes will be described hereinbelow with reference to FIG. 4 which is a graphic diagram showing spectral characteristics of the color separation filter F. In FIG. 4, the first color stripe R has a transmission characteristic (in the specification, the term "transmission" means energy transmission) having a peak transmission factor (indicated by character a) in the red color region and the second color stripe G has a transmission characteristic having a peak transmission factor (indicated by character b) in the green color region substantially equal in magnitude to that of the first color stripe R. Further, the third color stripe Cy has a transmission characteristic where a trough portion (indicated by character c) exists between 450 nm and 550 nm in wavelength, so that a negative peak transmission factor is present between 500 nm and 530 nm, a first peak transmission factor (indicated by character d) in the blue color region is substantially equal to the peak transmission factors of the first and second color stripes R, G and a second peak transmission factor (indicated by character e) is present in the vicinity of 540 nm in the green color region. The peak portion of the transmission factor curve of the third color stripe Cy in the green color region is similar in configuration to that of the second color stripe G, and the value of the peak transmission factor of the third color stripe Cy is lower than the values of the peak transmission factors of the first and second color stripes R, G, and is 50% to 80% of the peak transmission factors of the first and second color stripes R, G, preferably about 65%. On the contrary, the negative peak transmission factor is preferably 48%. In a wavelength region over a wavelength at which the third color stripe Cy has the second peak transmission factor, the ratio of a transmission factor of the third color stripe Cy to that of the second color stripe G falls within a range between 50% and 80% and the resulting value of the ratio is substantially maintained in that wavelength region. The crossing point (indicated by character f) between the transmission factor curve of the second color stripe G and the transmission factor curve of the third color stripe Cy is present in the vicinity of 500 and the crossing point (indicated by character g) between the transmission factor curves of the first color stripe R and the second color stripe G exists in the vicinity of 575 nm.

Figure 6:
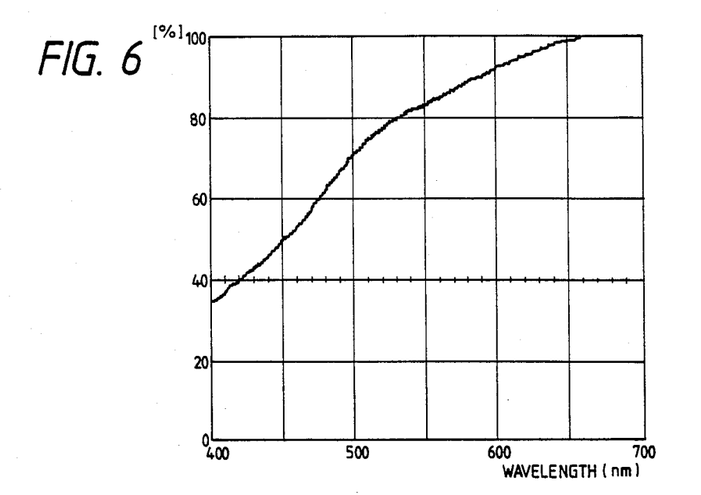
FIG. 6 is an illustration of a spectral sensitivity characteristic of a image pickup tube target.
Figure 7:
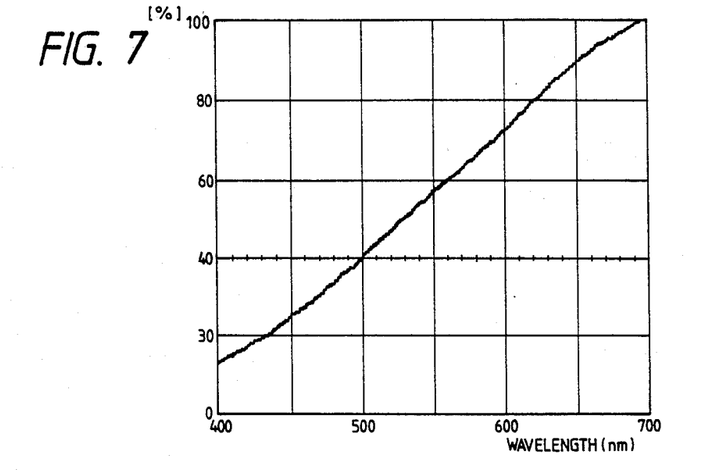
FIG. 7 is an illustration of a spectral energy distribution of a standard white color light (3200K)

This arrangement of the first to third color stripes R, G, Cy of the color separation stripe filter F, when imaging an achromatic color (white and black) object illuminated with a standard white light (3200K) which is usually used when the white balance adjustment of a color video camera is performed and which has the spectral energy distribution as shown in FIG. 6, allows the color image pickup tube 2 to generate the color multiplexed signal Sm including only a luminance signal which in turn shows a characteristic substantially corresponding to the spectral luminous efficiency of the human eye.

Figure 8:
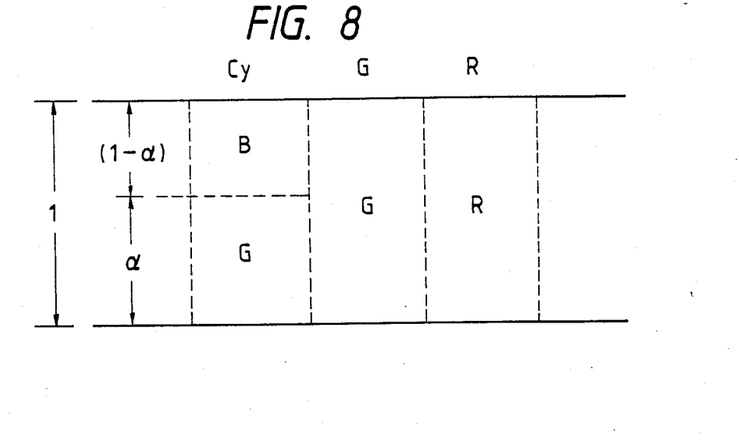
FIG. 8 is an illustration for describing the energy distribution of transmitted light of color stripes of the FIG. 4 color separation stripe filter.

FIG. 8 shows one example of generated current amounts of the signal Sm due to the first to third color stripes R, G, Cy. In FIG. 8, the current amount due to the third color stripe Cy is expressed as $B+\alpha G$ where $\alpha$ is the ratio of the second peak transmission factor of the third stripe Cy to the peak transmission factor of the second stripe G, and when taking an achromatic object by the color image pickup apparatus including the aforementioned color separation stripe filter, the output signal Sm (in this case, only luminance signal Y) is given in accordance with the following equation (1).

$$Sm = Y = (1-\alpha)G + R + (1-\alpha)B \quad \ldots (1)$$

The state of the luminance signal Y can be freely changed in accordance with variation of the value of $\alpha$ in the equation (1). For example, when $\alpha=0.7$, the equation (1) is rewritten as follows.

$$Y = 0.57G + 0.33R + 0.1B \quad \ldots (2)$$

The signal indicated by the equation (2) results in having a characteristic extremely coincident with the spectral luminous efficiency the of human eye.

The color separation stripe filter can be manufactured in accordance with a process similar to the dichroic mirror manufacturing method. For example, as the third color stripe Cy is used a multi-layer film which is formed by alternative deposition of silicon dioxide ($SiO_2$) and titanium dioxide ($TiO_2$). The thickness of one layer is about 20 nm to 120nm and the number of the layers is about 11, but not limited thereto.

Figure 9:
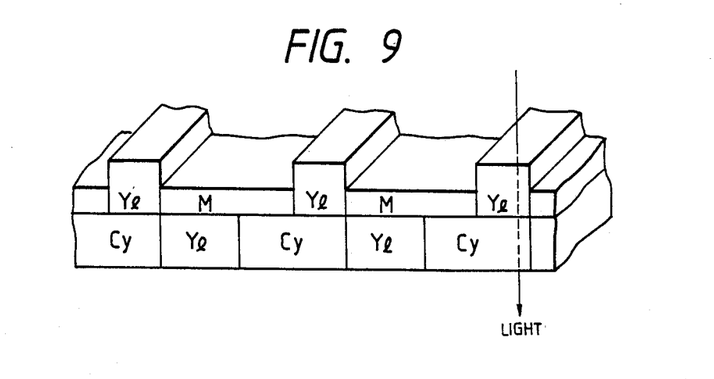
FIG. 9 is an illustration of an arrangement of a color separation stripe filter according to a second embodiment of this invention.
Figure 10A:
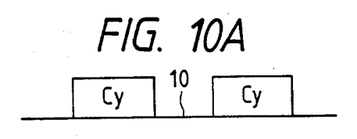
FIGS. 10A, 10B and 10C are illustrations for describing manufacturing steps of the FIG. 9 color separation stripe filter.
Figure 10B:
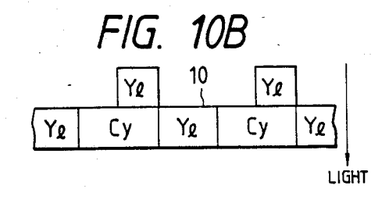
Figure 10C:
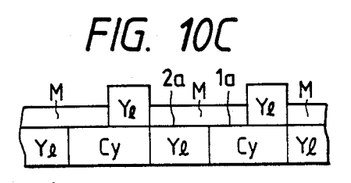

A second embodiment of the present invention will be described hereinbelow with reference to FIGS. 9 through 13. FIG. 9 is an illustration of an arrangement of a color separation stripe filter according to the second embodiment of this invention which is incorporated into a color image pickup apparatus and and FIGS. 10A to 10C are illustrations for describing the manufacturing steps thereof. As seen in FIG. 9, the color separation stripe filter of this embodiment comprises cyan color stripes Cy, yellow color stripes Yl and magenta color stripes M, the cyan color stripes Cy cutting off the red color component, yellow color stripes Yl cutting off the blue color component and magenta color stripes M repressing the green color component. In FIGS. 10A to 10C, the cyan color stripes Cy are first placed at predetermined intervals on a transparent plate 10 and secondly the half of the yellow color stripes Yl are disposed in the spaces between the cyan color stripes Cy to be placed on the transparent plate 10 and further the remaining half thereof are piled up on upper surfaces of the cyan color stripes Cy in the light-advancing direction. Finally, the magenta color stripes M are placed on the cyan color stripes Cy and the yellow color stripes Yl in the spaces between the yellow color stripes Yl piled up on the cyan color stripes Cy to substantially cover the upper surfaces 2a of the yellow color stripes, which are placed in the spaces between the cyan color stripes Cy, and the exposed portions 1a of the cyan color stripes Cy on which the yellow color stripes Yl are not piled up.

Figure 11:
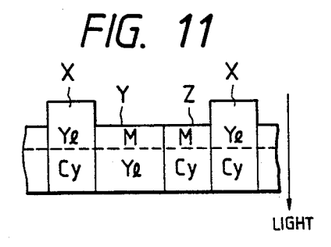
FIG. 11 is an illustration for describing an optical feature of the FIG. 9 color separation stripe filter with respect to light incident thereon.
Figure 12:
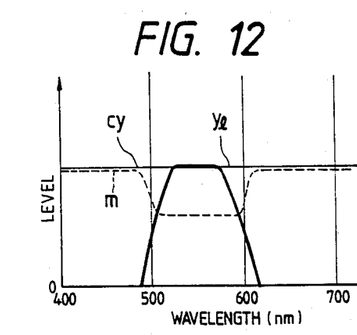
FIG. 12 is a graphic diagram showing spectral characteristics of color stripes used for making up the FIG. 9 color separation stripe filter.

This arrangement results in the fact that the completed color separation filter consists of a plurality of groups of first to third portions X to Z as shown in FIG. 11, the first portion X being composed of a portion of a cyan color stripe Cy on which a yellow color stripe Yl is piled on and the yellow color stripe Yl which is placed on the portion of the cyan color stripe, the second portion Y being composed of a yellow color stripe Yl which is placed on the transparent plate 10 and a portion of a magenta color stripe M which is placed on the yellow color stripe Yl, and third portion Z being composed of a portion of a magenta color stripe M which is piled up on a portion of a cyan color stripe Cy and the portion of the cyan color stripe Cy on which the portion of the magenta color stripe M is piled up. The incident light is separated when passed through the first to third portions X to Z. FIG. 12 is a graphic diagram showing the characteristic of the color separation stripe filter of the second embodiment where characters cy, yl and m represent the respective spectral charactristics of the cyan color stripe Cy, yellow color stripe and magenta color stripe M.

Figure 13:
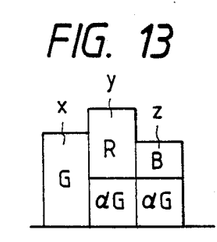
FIG. 13 is an illustration for describing the energy relation among color components of light passed through the FIG. 9 color separation stripe filter.

FIG. 13 is a diagram showing the energy relation among color components of light passed through the above-mentioned first to third portions X to Z. In FIG. 13, characters x, y, z respectively designate the transmission light of the first to third portions X to Z. The transmission light x has a characteristic obtained by multiplying the transmission light of the cyan color stripe Cy by the transmission light of the yellow color stripe Yl so as to become a green color component (G). The transmission light y has a characteristic obtained by multiplying the transmission light of the yelow color stripe Yl by the transmission light of the magenta color stripe M to become a yellow color component where the green region is lowered, i.e., become a ($R + \alpha G$) component. Here, $\alpha$ is a constant determined by the transmission factor of the magenta color stripe M with respect to the green color component. The transmission light z has a characteristic obtained by multiplying the transmission light of the cyan color stripe Cy and the transmission light of the magenta color stripe M to become a cyan component lowered in the green region, i.e., become a ($B + \alpha G$).

Thus, the green component in the transmission light x is based on the spectral characteristics of the cyan color stripe Cy and yellow color stripe Yl, and the green components in the transmission light y, z are in the state that the green component of the transmission light x is multiplied by the constant $\alpha$ determined by the transmission factor of the magenta color stripe M. This results in the green components in the respective transmission light x to z being substantially similar in configuration to each other.

When the color separation stripe filter of the second embodiment is employed for a color image pickup apparatus, for the three primary color demodulation, three color signals corresponding to the transmission light x to z are first demodulated and each of the obtained signal is then separated into three primary color signals.

Of the three primary color signals on the spectral characteristic, the G signal is obtained in correspondance with the transmission light x and the R signal and B signal are given in accordance with the following equations.

$$R = (R + \alpha G) - KG$$

$$B = (B + \alpha G) - KG$$

where $\alpha$ and K are constants determined by the transmission factor of the magenta color stripe M with respect to the green component. Here, in the case of performing the color multiplexing, it may be required that the modulation on imaging a low saturation (white color) object is made small and the luminance characteristic is excellent.

In a color multiplex type image pickup apparatus having the color separation stripe filter of the second embodiment, the luminance characteristic is determined by the average component of the respective transmission light shown in FIG. 13. The luminance Y is expressed as follows.

$$Y = (1 + 2\alpha)G + R + B$$

While on the actual imaging R becomes greater than B due to the spectral characteristics of a light source, a lens and so on, when $\alpha$ is determined to be about 0.6, an ideal luminance characteristic can substantially be realized. Furthermore, although the energy relation of the respective color components in taking a low saturation object is as shown in FIG. 13, similarly, when $\alpha$ is determined to be about 0.6, the modulation is at a minimum.

Although in the above description the cyan color stripe and yellow color stripe are used for making up the color separation stripe filter, this embodiment is not limited thereto. In addition, although this embodiment is not limited to using the magenta color stripe, other stripes can be used if they have a characteristic that the transmission factor of the green color component is lower than the transmission factors of the red and blue color components.

Figure 14:
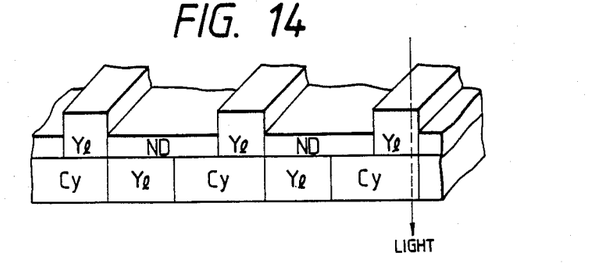
FIG. 14 shows an arrangement of a color separation stripe filter according to a third embodiment of this invention.
Figure 15A:
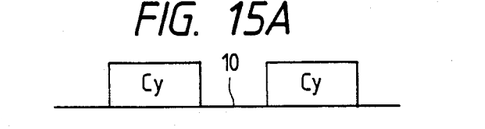
FIGS. 15A, 15B and 15C are illustration for describing manufacturing steps of the FIG. 14 color separation stripe filter.
Figure 15B:
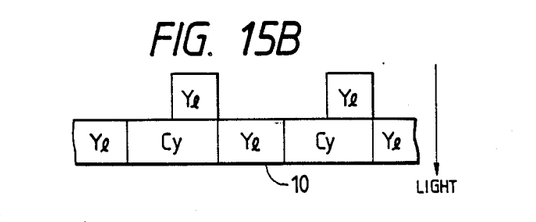
Figure 15C:
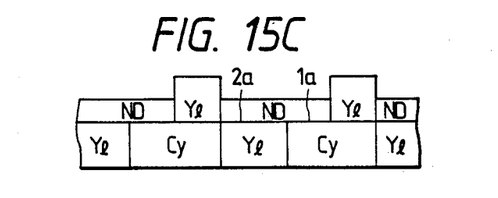

A third embodiment of this invention will be described hereinbelow with reference to FIGS. 14 to 18. FIG. 14 is an illustration of an arrangement of a color separation stripe filter according to the third embodiment and FIGS. 15A to 15C are illustrations for describing a manufacturing process of the color separation stripe filter. One difference between the third embodiment and the above-mentioned second embodiment is that neutral density stripes are used in place of the magenta color stripes M. Parts corresponding to those in the second embodiment will be marked with the same numerals and characters. As shown in FIG. 14, the color separation stripe filter of the third embodiment comprises cyan color stripes Cy, yellow color stripes Yl and neutral density stripes ND, the cyan color stripes Cy and yellow color stripes Yl being formed in accordance with the multi-layer deposition technique and the neutral density stripes being made of metallic layers. In FIGS. 15A to 15C, as well as in the case of the above-mentioned second embodiment, the cyan color stripes Cy are placed on a transparent plate 10 at predetermined intervals and the half of the yellow color stripes Yl are arranged in the spaces between the cyan color stripes Cy to be placed on the transparent plate 10 and further the remaining half thereof are placed on portions of the cyan color stripes Cy. The neutral density stripes ND are disposed in the spaces between the yellow color stripes which is piled on the cyan color stripes Cy so as to substantially cover the upper surfaces 2a the yellow color stripes Yl placed on the transparent plate 10 and the exposed portions 1a of the cyan color stripes Cy.

Figure 16:
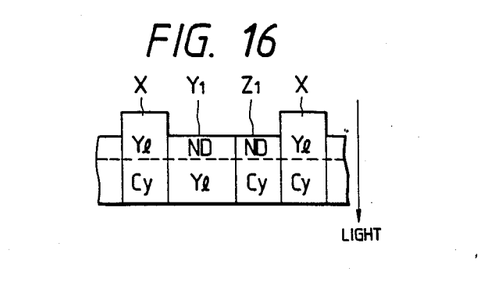
FIG. 16 is an illustration for describing an optical feature of the FIG. 14 color separation stripe filter.
Figure 17:
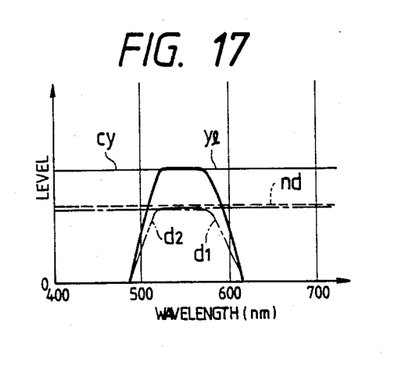
FIG. 17 is a graphic diagram showing spectral characteristics of color stripes used in the FIG. 14 color separation filter.

The color separation stripe filter thus arranged results in comprising first to third portions X, Y1 and Z1 as shown in FIG. 16, the first portion X being composed of a cyan color stripe Cy and a yellow color stripe Yl, the second portion Y1 being composed of a yellow color stripe Yl and a portion of a neutral density stripe ND which is piled on the yellow color stripe Yl, and the third portion Z1 being composed of a cyan color stripe Cy and a portion of the neutral density stripe ND which is placed on the cyan color stripe Cy. FIG. 17 shows the characteristic of the color separation stripe filter where characters cy, yl, nd represent the spectral characteristics of the cyan color stripe Cy, yellow color stripe Yl and neutral density stripe ND, respectively, and character d1 designates the spectral characteristic of the third portion Z1, character d2 depicts the spectral characteristic of the second portion Y1. Because the neutral density stripe ND is made of a metallic layer, the spectral characteristic d1 has a characteristic obtained by multiplication of the spectral characteristic cy and the spectral characteristic so as not to include ripples, and the spectral characteristic d2 has a characteristic obtained by multiplication of the spectral characteristic yl and the spectral characteristic nd so as not to contain ripples.

Figure 18:
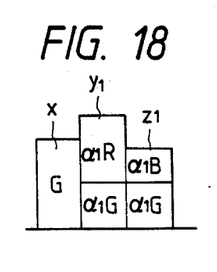
FIG. 18 is an illustration for describing the energy relation among color components of light passed through the FIG. 11 filter.

FIG. 18 shows the energy relation among color components of light passed through the respective first to third portions X, Y1 and Z1 where character x, y1, z1 represent the transmission light of the respective portions X, Y1, Z1. The transmission light x has a characteristic obtained by multiplication of the cyan color stripe Cy and yellow color stripe Yl so as to be become a green component, and the transmission light y1 has a characteristic obtained by multiplication of the respective transmission light of the yellow color stripe Yl and the neutral density stripe ND to become a yellow component, i.e., become a $(\alpha 1R + \alpha 1G)$ component. Here, $\alpha 1$ is a constant determined by the transmission factor of the neutral density stripe ND. Furthermore, the transmission light z1 has a characteristic obtained by multification of the respective transmission light of the cyan color stripe Cy and the neutral density stripe ND to become a cyan component, i.e., $(\alpha 1B + \alpha 1G)$ component.

Thus, the green component of the transmission light x is based upon the spectral characteristics of the cyan color stripe Cy and yellow color stripe Yl, and the green components of the transmission light y1, z1 are respectively determined by the spectral characeristics d1 and d2, that is, they assume the multiplication of the green component of the transmission light x by the constant determined by the transmission factor of the neutral density stripe ND. The spectral characteristics d1 and d2 are respectively close to the ideal characteristics whereby the green components in the transmission light x, y1, z1 are substantially similar in configuration to each other. This can result in realizing a substantially ideal luminance characteristic under the condition that $\alpha 1$ is determined to be about 0.6 to minimize the modulation in taking a low saturation object.

Figure 19:
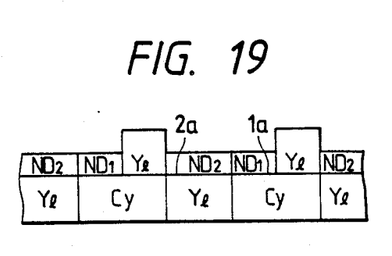
FIG. 19 illustrates an arrangement of a color separation stripe filter according to a fourth embodiment of this invention.

Furthermore, a fourth embodiment of this invention will be described hereinbelow with reference to FIGS. 19 to 22. As shown in FIG. 19, a color separation stripe filter of the fourth embodiment comprises cyan color stripes Cy, yelloe color stripes Yl, first neutral density stripes ND1, and second neutral density stripes ND2. The cyan color stripes Cy are arranged at predetermined intervals and the half of the yellow color stripes Yl are disposed in the spaces between the cyan color stripes Cy and the remaining half thereof are placed thereon. The second neutral density stripes ND2 are placed on the upper surfaces 2a of the yellow color stripes Yl which are disposed in the spaces between the cyan color stripes Cy and the first neutral density spripes ND1 are placed on portions 1a of the upper surfaces of the cyan color stripes Cy, on which the yellow color stripes Yl are not placed, so as to be interposed between the first neutral density stripes ND1 and the yellow color stripes Yl which are placed on the cyan color stripes Cy. The first and second neutral density stripes ND1 and ND2 are different in spectral characteristic from each other.

Figure 20:
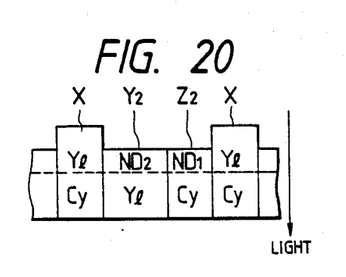
FIG. 20 is an illustration for describing an optical feature of the FIG. 19 filter with respect to light incident thereon.
Figure 21:
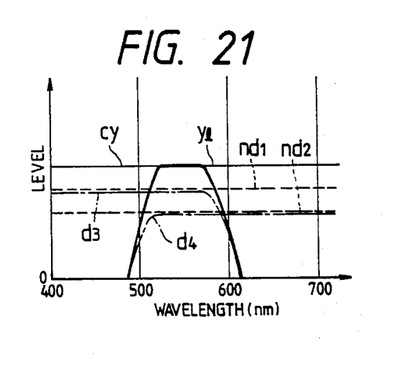
FIG. 21 is a graphic diagram showing spectral characteristics of stripes used in the FIG. 19 filter.

The color separation stripe filter thus arranged results in comprising first to third portions X, Y2 and Z2 as illustrated in FIG. 20, the first portion being composed of a cyan color stripe Cy and a yellow color stripe Y1 placed thereon, the second portion Y2 being composed of a yellow color stripe and a second neutral density stripe ND2 placed thereon, and the third portion being composed of a portion of a cyan color stripe Cy and a second neutral density stripe ND1 placed thereon. FIG. 21 shows a characteristic of the color separation stripe filter where characters nd1, nd2, d3, d4 represent spectral characteristics of the first neutral density stripe ND1, second neutral density stripe ND2, third portion Z2 and second portion Y2, respectively. The spectral characteristics nd1 and nd2 are appropriately determined in accordance with the difference between the sensitivity for the red component and the sensitivity for the blue component.

Since the first and second neutral density stripes ND1 and ND2 are respectively made of metallic layers, the spectral characteristic d3 has a characteristic obtained by multiplication of the spectral characteristics cy and nd1, not including ripples, and also the spectral characteristic d4 has a characteristic obtained by multiplication of the spectral characteristics y1 and nd2, not having ripples.

Figure 22:
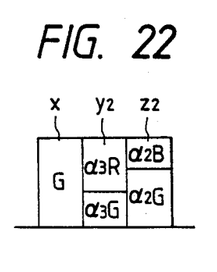
FIG. 22 is an illustration for describing the energy relation among color components of light passed through the FIG. 19 filter.

FIG. 22 illustrates energy relation of color components of light passed through the first to third portions X, Y2 and Z2, where characters y2 and z2 designate the transmission light of the second and third portions Y2 and Z2. The transmission light y2 has a characteristic obtained by multiplying the transmission light of the yellow color stripe Y1 by the transmission light of the second neutral density stripe ND2 so as to become a yellow component, i.e., $(\alpha 3R + \alpha 3G)$ component. Here, $\alpha 3$ is a constant determined on the basis of the transmission factor of the second neutral density stripe ND2. Furthermore, the transmission light z2 has a characteristic by multiplication of the transmission light of the cyan color stripe Cy and first neutral density stripe ND1 to become a cyan component, i.e., $(\alpha 2B + \alpha 2G)$ component. Since the spectral characteristics d3, d4 of the third and second portions Z2, Y2 respectively have substantially ideal characteristics, the green components in the respective transmission light x, y2, z2 are substantially similar in configuration to each other.

This arrangement causes an excellent color reproduction property, and when $\alpha 2$ is set to be about 0.7 and $\alpha 3$ is set to be about 0.5, it is possible to provide an ideal luminance characteristic. In addition, because the respective spectral characteristics nd1, nd2 of the first and second neutral density stripes ND1 and ND2 can be appropriately determined in accordance with the difference between the sensitivities for the red component and blue component in the image pickup apparatus, the modulation can be further repressed when taking a low saturation object, as compared with the case of the above-mentioned third embodiment. The modulation becomes a minimum under the condition that $\alpha 2$ is set to be about 0.7 and $\alpha 3$ is set to be about 0.5.

Figure 23:
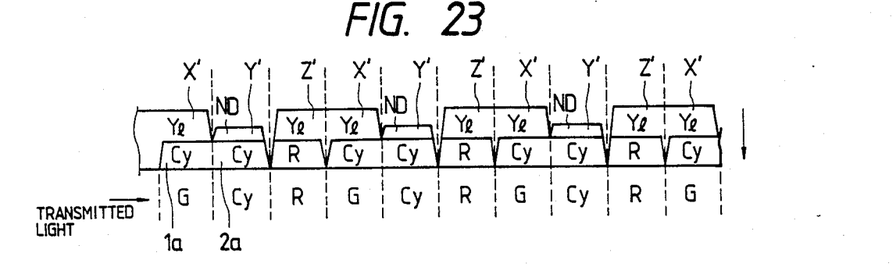
FIG. 23 shows an arrangement of a color separation stripe filter according to a fifth embodiment of this invention.

A fifth embodiment of this invention will be described hereinbelow with reference to FIGS. 23 through 25, FIG. 23 being a diagram showing an arrangement of the color separation stripe filter of the fifth embodiment and FIG. 24 being an illustration of a spectral characteristic of the color separation stripe filter. As shown in FIG. 23, the color separation stripe filter of the fifth embodiment comprises a combination of yellow color stripes Y1, cyan color stripes Cy, red color stripes R and neutral density stripes ND so as to provide a plurality of groups of first to third portions X' to Z'. The first portion X' is composed of a portion 1a of a cyan color stripe Cy and a portion of a yellow color stripe Y1 piled up on the portion of the cyan color stripe Cy in a light-advancing direction, the second portion Y' is composed of the other portion 2a of the Cyan color stripe Cy and a neutral density stripe ND placed thereon in the light-advancing direction, and the third portion X' is composed of a red color stripe R and the other portion of the yellow color stripe Y1 placed thereon in the light-advancing direction. That is, a portion of the yellow color stripe Y1 and a neutral density stripe ND are placed side by side on a cyan color stripe Cy so as to provide the first and second portions X' and Y' and the other portion of yellow color stripe Y1 is placed on a red color stripe R which is disposed in line between the two adjacent cyan color stripes Cy. The first to third portions X' to Z' are adapted so as to transmit green color light, cyan color light and red color light, respectively. Here, the light transmission factor $\alpha'$ of the neutral density stripe ND is determined so that the output levels of color signals in a color image pickup apparatus are equal to each other. In this embodiment, the transmission factor $\alpha'$ may be determined to be 0.7 to 0.75.

Figure 24:
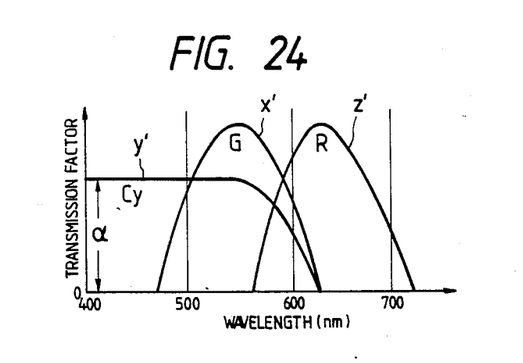
FIG. 24 is a graphic illustration for describing spectral characteristics of portions of the FIG. 23 filter.

In FIG. 24, characters x', y', z' denote the spectral characteristics of the first to third portions X' to Z'. The spectral characteristic x' of the first portion X' for obtaining green color (G) light has a characteristic obtained by multiplication of the spectral characteristics of the yellow color stripe Y1 and cyan color stripe Cy and the spectral characteristic y is determined by the spectral characteristics of the cyan color stripe Cy and neutral density stripe ND, the spectral characteristic of the neutral density stripe being stable.

Here, the variation of the spectral characteristic of the yellow color stripe Y1 independently occurs at the shorter wavelength side in the green region and corresponds to that of the R, G, B signals in a three tube type image pickup apparatus and does not affect the similarity relation between the spectral characteristics z', y' in the green region. Thus, the variations of the spectral characteristics x', y' are based upon variation of the spectral characteristic of the cyan color stripe Cy and are always similar to each other in the green region, whereby the similarity between the spectral characteristics x' and y' can always kept in the green region so as to realize an excellent color reproduction. Furthermore, even if the spectral characteristic of the cyan color stripe Cy is varied to some degree, since the similarity between the characteristics x', y' are maintained, the tolerance of the variation of the cyan color stripe Cy can be enlarged, thereby improving the yield in the manufacturing process.

Here, in a color multiplexing type image pickup apparatus in which the color separation stripe filter of this embodiment, the luminance signal Y is expressed in accordance with the following equation.

$$Y = G + R + \alpha'Cy = (1 + \alpha')G + R + \alpha'B$$

When R and G are respectively 1 in order to obtain the balance of the color multiplex carrier, $$\alpha'G + \alpha'B = 1.$$

Thus, when $\alpha' = 0.75$, $\alpha'B = 0.25$ and the luminance signal Y is as follows.

$$Y = 1.75G + R + 0.25B$$

Accordingly, the ratio of R, G, B is as follows.

$$G:R:B = 1.75:1:0.25$$

This is substantially 0.58:0.33:0.08 and corresponds to values necessary for obtaining an ideal luminance signal.

Figure 25:
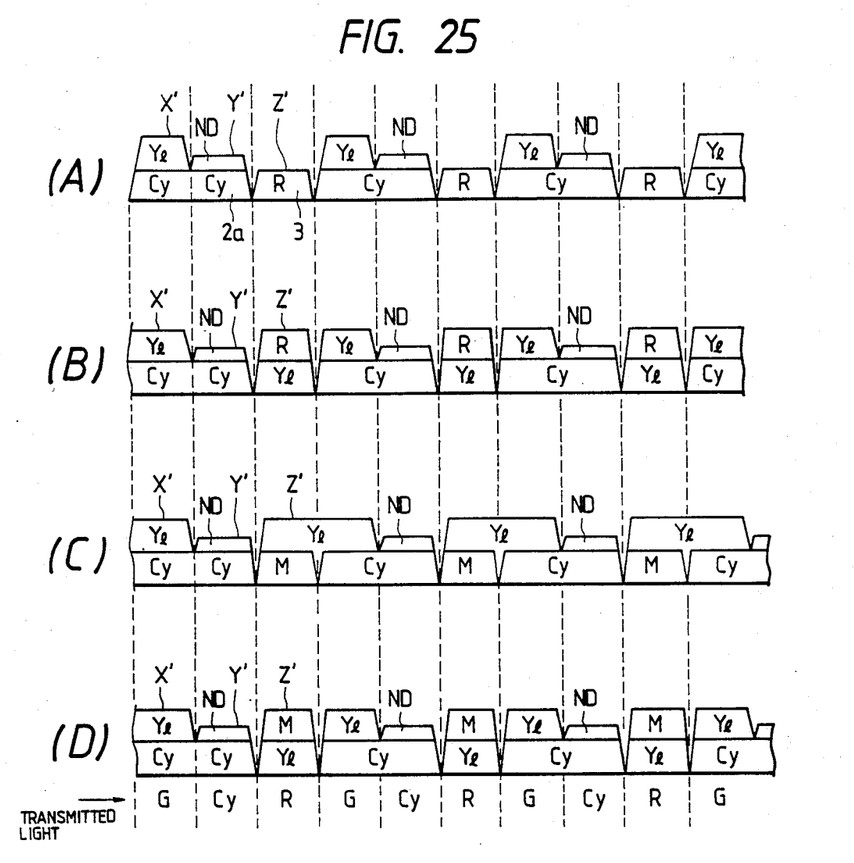
FIG. 25 are modifications of the FIG. 23 color separation stripe filter.

FIG. 25 are illustrations for describing modifications of the fifth embodiment color separation stripe filter. These modifications are similar to the fifth embodiment with the exception of the arrangement of the third portion Z'. That is, in a filter shown in (A) of FIG. 25, the third portion Z' is composed of only a red color stripe R, in a filter shown in (B), a red color stripe R is piled up on a yellow color stripe Y1, in a filter shown in (C), a portion of a yellow color stripe Y1 is placed on a magenta color stripe M, and in a filter shown in (D), a magenta color stripe M is disposed on a yellow color stripe Y1.

It should be understood that the foregoing relates to only preferred embodiments of the present invention, and that it is intended to cover all changes and modifications of the embodiments of this invention herein used for the purposes of the disclosure, which do not constitute departures from the spirit and scope of the invention.

What is claimed is:

1. In a color image pickup apparatus including a color image pickup tube in which a color image is focused on a photo-electric conversion target through a color separation stripe filter disposed in a light path leading to said photoelectric conversion target and converted to an electrostatic image which is scanned in raster form having a scanning direction by an electron beam under control of a deflection system so as to generate a color multiplexed signal from said photo-electric conversion target, said color separation stripe filter comprising a plurality of recurrent groups of a first color stripe for transmitting red color light, a second color stripe for transmitting green color light and a third color stripe for transmitting cyan color light successively arranged at periodic intervals, wherein said first color stripe has a transmission characteristic showing a peak transmission factor in a red color region, said second color stripe has a transmission characteristic showing a peak transmission factor in a green color region which peak transmission factor is substantially equal to said peak transmission factor of said first color stripe, and said third color stripe has a transmission characteristic showing negative peak transmission factor at a wavelength between 500 nm and 530 nm so as to produce first and second peak transmission factors in a blue region and said green region, said first peak transmission factor being substantially equal to each of said peak transmission factors of said first and second color stripes, the second peak transmission factor of the third color stripe occurring substantially at the same wavelength as the peak transmission factor of the second color stripe, and the ratio of a transmission factor of the third color stripe to that of the second color stripe falling within a range between 50% and 80% in a wavelength region over a wavelength at which the second color stripe has the peak transmission factor and the resulting value of the ratio within this range is substantially maintained in said wavelength region, each stripe of said color separation stripe filter extending in a direction normal to said scanning direction of said electron beam.

2. A color separation stripe filter as claimed in claim 1, wherein curves of said transmission characteristics of said second and third color stripes cross each other in the vicinity of wavelength of 500 nm and curves of said transmission characteristics of said first and second color stripes cross each other in the vicinity of wavelength of 575 nm.

3. A color separation stripe filter as claimed in claim 1, wherein said second peak transmission factor of said third color stripe is about 65% of said peak transmission factor of said second color stripe and the negative peak transmission factor of said third color stripe is about 48% of said peak transmission factor of said second color stripe.

4. In a color image pickup apparatus including a color image pickup tube in which a color image is focused on a photo-electric conversion target through a color separation stripe filter disposed in a light path leading to said photo-electric conversion target and converted to an electrostatic image which is scanned in raster form by an electron beam under control of a deflection system so as to generate a color multiplexed signal from said photo-electric conversion target, said color separation stripe filter comprising a plurality of recurrent groups of first to third portions successively arranged at periodic intervals in directions normal to a direction of light advancing to said color separation stripe filter, wherein said first portion is composed of a portion of a first color stripe for cutting off transmission of a red color component of the light and a second color stripe for cutting off transmission of a blue component of the light, said second color stripe being piled up on said portion of said first color stripe in the light-advancing direction, said second portion is composed of another second color stripe and a portion of a third color stripe for repressing transmission of a green component of the light, said portion of said third color stripe being piled up on said another second color stripe in the light-advancing direction, said third portion is composed of the other portion of said first color stripe and the other portion of said third color stripe which is piled up thereon in the light-advancing direction, said third color stripe having a transmission characteristic in which a transmission factor for the green component is smaller than transmission factors for the red and blue components.

5. In a color image pickup apparatus including a color image pickup tube in which a color image is focused on a photo-electric conversion target through a color separation stripe filter disposed in a light path leading to said photo-electric conversion target and converted to an electrostatic image which is scanned in raster form by an electron beam under control of a deflection system so as to generate a color multiplexed signal from said photo-electric conversion target, said color separation stripe filter comprising a plurality of recurrent groups of first to third portions successively arranged at periodic intervals in directions normal to a direction of light advancing to said color separation stripe filter, wherein said first portion is composed of a portion of a first color stripe for cutting off transmission of a red color component of the light and a second color stripe for cutting off transmission of a blue component of the light, said second color stripe being piled up on said portion of said first color stripe in the light-advancing direction, said second portion is composed of another second color stripe and a portion of a neutral density stripe which is made of a metallic layer, said portion of said neutral density stripe being piled up on said another second color stripe in the light-advancing direction, said third portion is composed of the other portion of said first color stripe and the other portion of said neutral density stripe which is piled up thereon in the light-advancing direction.

6. A color separation stripe filter as claimed in claim 5, wherein the portion of said neutral density stripe which is plied up on said another second color stripe and the other portion thereof which is plied up on the other portion of said first color stripe are different in optical characteristic from each other.

7. In a color image pickup apparatus including a color image pickup tube in which a color image is focused on a photo-electric conversion target through a color separation stripe filter disposed in a light path leading to said photo-electric conversion target and converted to an electrostatic image which is scanned in raster form by an electron beam under control of a deflection system so as to generate a color multiplexed signal from said photo-electric conversion target, said color separation stripe filter comprising a plurality of recurrent groups of first to third portions successively arranged at periodic intervals in directions normal to a direction of light advancing to said color separation stripe filter, wherein said first portion is composed of a portion of a first color stripe for transmitting cyan color light and a second color stripe for transmitting yellow color light so as to transmitting first color light, said second color stripe being piled up on said portion of said first color stripe in the light-advancing direction, said second portion is composed of the other portion of said first color stripe and a neutral density stripe piled up thereon in the light-advancing direction so as to transmit second color light, and said third portion is arranged so as to transmit third color light.

8. A color separation stripe filter as claimed in claim 7, wherein said third portion is composed of a third color stripe which transmits red color light and another second color stripe which is piled up thereon in the light-advancing direction.

9. A color separation stripe filter as claimed in claim 7, wherein said third portion is composed of only a third color stripe which transmits red color light.

10. A color separation stripe filter as claimed in claim 7, wherein said third portion is composed of another second color stripe and a third color stripe which transmits red color light and which is piled up thereon in the light-advancing direction.

11. A color separation stripe filter as claimed in claim 7, wherein said third portion is composed of a third color stripe for transmitting magenta color light and another second color stripe which is piled up thereon in the light-advancing direction.

12. A color separation stripe filter as claimed in claim 7, wherein said third portion is composed of another second color stripe and a third color stripe which transmits magenta color light and which is piled up thereon in the light-advancing direction.

* * * * *